(12) United States Patent
Patel

(10) Patent No.: US 8,687,800 B2
(45) Date of Patent: Apr. 1, 2014

(54) ENCRYPTION METHOD FOR MESSAGE AUTHENTICATION

(75) Inventor: Sarvar Patel, Montville, NJ (US)

(73) Assignee: Alcatel Lucent, Paris (FR)

( * ) Notice: Subject to any disclaimer, the term of this patent is extended or adjusted under 35 U.S.C. 154(b) by 903 days.

(21) Appl. No.: 11/540,790

(22) Filed: Sep. 29, 2006

(65) Prior Publication Data

US 2008/0137837 A1  Jun. 12, 2008

Related U.S. Application Data

(60) Provisional application No. 60/837,683, filed on Aug. 15, 2006.

(51) Int. Cl.
*H04L 29/06* (2006.01)

(52) U.S. Cl.
USPC ............................................ 380/28; 713/150

(58) Field of Classification Search
None
See application file for complete search history.

(56) References Cited

U.S. PATENT DOCUMENTS

| | | | |
|---|---|---|---|
| 4,078,152 A * | 3/1978 | Tuckerman, III | 380/37 |
| 5,757,913 A * | 5/1998 | Bellare et al. | 713/168 |
| 6,243,470 B1 * | 6/2001 | Coppersmith et al. | 380/259 |
| 6,259,789 B1 * | 7/2001 | Paone | 380/28 |
| 6,314,190 B1 * | 11/2001 | Zimmermann | 380/282 |
| 6,351,539 B1 * | 2/2002 | Djakovic | 380/268 |
| 6,769,063 B1 * | 7/2004 | Kanda et al. | 713/193 |
| 6,963,976 B1 | 11/2005 | Jutla | |
| 6,973,187 B2 * | 12/2005 | Gligor et al. | 380/28 |
| 7,007,050 B2 * | 2/2006 | Saarinen | 708/250 |
| 7,093,126 B1 | 8/2006 | Jutla | |
| 7,184,549 B2 * | 2/2007 | Sorimachi et al. | 380/37 |
| 7,454,016 B2 * | 11/2008 | Tsunoo | 380/29 |
| 7,715,553 B2 * | 5/2010 | Smith et al. | 380/29 |
| 7,933,410 B2 * | 4/2011 | Fahrny | 380/201 |
| 7,966,495 B2 * | 6/2011 | Ackerman et al. | 713/180 |
| 8,379,841 B2 * | 2/2013 | Taylor et al. | 380/28 |
| 2001/0031050 A1 * | 10/2001 | Domstedt et al. | 380/44 |
| 2002/0023209 A1 * | 2/2002 | Domstedt et al. | 713/160 |
| 2002/0051537 A1 * | 5/2002 | Rogaway | 380/46 |
| 2003/0002663 A1 * | 1/2003 | Kurdziel | 380/37 |
| 2005/0169465 A1 | 8/2005 | Itani | |
| 2006/0056623 A1 * | 3/2006 | Gligor et al. | 380/28 |

(Continued)

FOREIGN PATENT DOCUMENTS

| | | |
|---|---|---|
| EP | 1 077 554 A1 | 2/2001 |
| JP | 59092649 A | 5/1984 |

(Continued)

OTHER PUBLICATIONS

Bruce Schneier ED, "Applied Cryptography Second Edition", Applied Cryptography. Protocols; Algorithms, and Source Code in C, New York, John Wiley & Sons, US, '996, p. 193-194, 2001-201, XP002460342, ISBN: 0-471-11709-9, p. 193, line 20—last line; figure 9.3, p. 200, line 1, p. 201, line 4; figure 9.9.

(Continued)

*Primary Examiner* — Michael R Vaughan

(57) ABSTRACT

In an encryption method, an input block of data is reversibly processed to produce a string that is at least partially randomized. The randomized string is then encrypted by a block cipher. In decryption, the input block of encrypted data is first decrypted with respect to the block cipher. Then the randomization is reversed.

16 Claims, 4 Drawing Sheets

(56) References Cited

U.S. PATENT DOCUMENTS

| | | | | |
|---|---|---|---|---|
| 2007/0058806 A1* | 3/2007 | Ferguson | | 380/42 |
| 2007/0237327 A1* | 10/2007 | Taylor et al. | | 380/37 |
| 2008/0253561 A1* | 10/2008 | Minematsu | | 380/29 |
| 2009/0138710 A1* | 5/2009 | Minematsu | | 713/170 |
| 2009/0296928 A1* | 12/2009 | Matsumoto et al. | | 380/46 |
| 2011/0286599 A1* | 11/2011 | Tuyls et al. | | 380/278 |

FOREIGN PATENT DOCUMENTS

| | | |
|---|---|---|
| JP | 2027389 A | 1/1990 |
| JP | 9018469 A | 1/1997 |
| JP | 10303879 A | 11/1998 |
| JP | 10327141 A | 12/1998 |
| JP | 2001-211166 | 8/2001 |
| WO | PCT/US2007/017650 | 12/2007 |

OTHER PUBLICATIONS

Jutla, C.S., A Parallelizable Authenticated Encryption Algorithm for IPsec, Network Working Group, IPsec Working Group, Nov. 2000, pp. 1-11, IETF, http://tools.ietf.org/html/draft-jutla-ietf-ipsec-esp-iapm-00.

Jutla, Chanranjit S., Encryption Modes With Almost Free Message Integrity, pp. 1-15, IBM T. J. Watson Research Center, Yorktown Heights, NY 10598, USA.

* cited by examiner

ENCRYPTION METHOD FOR MESSAGE AUTHENTICATION

CROSS REFERENCE TO RELATED APPLICATION

This application claims priority of Provisional Application Ser. No. 60/837,683 which was filed Aug. 15, 2006.

FIELD OF THE INVENTION

The invention relates to methods of secure encryption of messages.

ART BACKGROUND

In many types of communication, there is a need to protect messages from tampering and unauthorized access. Encryption has long been used for such purposes. In advanced applications of encryption techniques, encryption keys are used not only to provide security for the encrypted messages, but also to protect the integrity of the messages. For example, a digital signature may be appended to a message prior to transmission, and a second version of the digital signature computed from the received message by the receiving party. If the two versions of the digital signature disagree, the receiving party will know that the integrity of the message was compromised by tampering.

To assure the integrity of a message, it is desirable to send the message, together with the appended digital signature, under the protection of a cipher that is non-malleable. The property of non-malleability assures that if even one bit of the encrypted message is changed as the result, e.g., of a malicious attack, the effects of the change will be distributed throughout the message upon decryption. Therefore, in particular, there will be a high probability that the digital signature is affected, and will fail to agree with the version locally computed by the receiving party.

One type of cipher used for encryption of messages is referred to as a block cipher. A block cipher takes blocks of binary data of fixed length as input strings, and produces blocks of binary data of fixed length as output strings. For example, Advanced Encryption Standard (AES) is a well-known block cipher that typically has input and output blocks of 128 bits.

One way to apply a block cipher such as AES is by Electronic Codebook (ECB) encryption. In ECB encryption, the message is divided into blocks of appropriate input length for the block cipher, and each block, in turn, is independently encrypted using the block cipher.

One weakness of ECB encryption is that it is susceptible to replay attacks. That is, an attacker may be looking for a recurrent string within the transmitted message. In ECB encryption, the recurrence of a plaintext string may lead to recurrence of the same encrypted string. In such a case, the recurrence may be recognized by the attacker.

Various attempts have been made to make encryption methods more robust against tampering, replay attacks, and other kinds of attack. One example of a more robust approach is described in U.S. patent Ser. No. 11/261,399, filed on Oct. 28, 2005 by S. Patel et al. under the title, "Air-Interface Application Layer Security For Wireless Networks," and commonly assigned herewith. In that approach, a block cipher, for example, is used to generate a pair of pseudorandom strings A and B. The block X of plaintext is encrypted by forming the expression AX+B, where A and X are combined using polynomial multiplication. The combined use of the strings A and B provides non-malleability as well as robustness against reply attacks.

Although useful, such a polynomial encryption method is relatively costly because the multiplication operation for encryption and more so its inverse for decryption are computationally intense.

Hence, there remains a need for robust encryption methods that are economical in their use of computational resources.

SUMMARY OF THE INVENTION

We have found such a method. In a broad aspect, our method reversibly processes an input block of data to produce a string that is at least partially randomized. The randomized string is then encrypted by a block cipher. In decryption, the input block of encrypted data is first decrypted with respect to the block cipher. Then the randomization is reversed.

DETAILED DESCRIPTION

The encryption method described here will have particular application for protecting the security and integrity of wireless transmissions of all kinds of content, including data traffic, voice traffic, and signaling data. Such transmissions may take place for example, and without limitation, between a wireless user terminal and a base station of the wireless network. However, the described method is not limited solely to wireless networks, but instead may also find suitable application in the domain of wireline communication. Likewise, it is appropriate for protecting communications between network entities of various kinds, including user terminals and network servers and switches.

In a particular example, a session key K is securely exchanged in advance between two parties to the protected communication. By well-known methods, the session key is used to generate two further keys K1 and K2. For example, K1 may be generated by the AES algorithm taking K as the input key and the integer 1, suitably padded with zeroes, as the argument: $K1=AES_K(1)$. Similarly, we may have $K2=AES_K(2)$. The key K1 is used with AES to generate pseudorandom strings of bits $AES_{K1}(1)$, $AES_{K1}(2)$, etc. By way of illustration, the arguments of AES for forming the pseudorandom strings may be the successive integers 1, 2, etc., suitably padded. However, any sequence of values may be used, as long as the same values are also known to the receiver for use in decryption.

Figure 1:
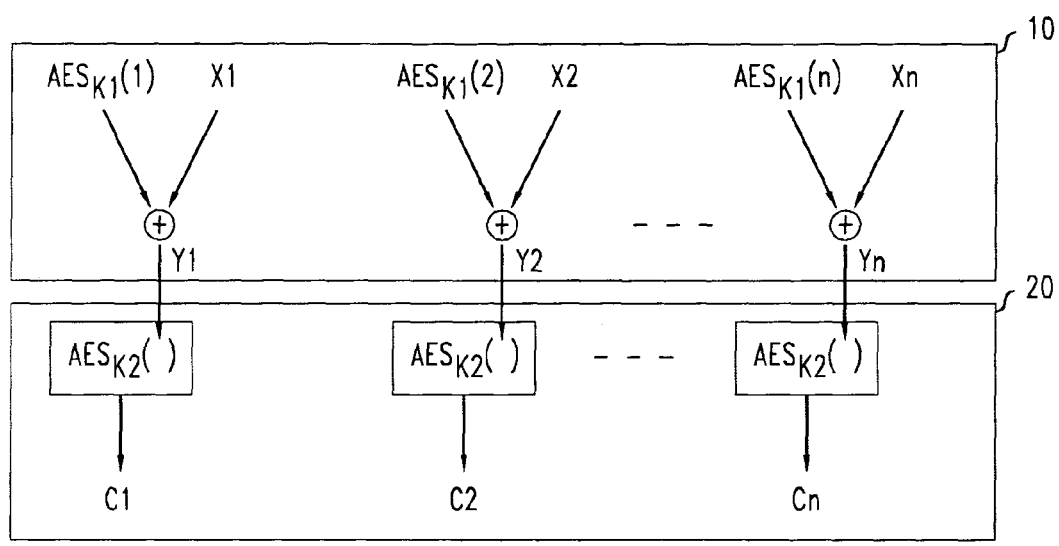
FIG. 1 is a flow diagram illustrating an encryption method according to the invention in one example embodiment.

With reference to FIG. 1, in a first encryption step 10, n blocks of input data $X1, \ldots, Xn$ are encrypted by AES according to: $Y1=AES_{K1}(1) \oplus X1$, $Y2=AES_{K1}(2) \oplus X2$, ..., $Yn=AES_{K1}(n) \oplus Xn$. In the preceding expressions, the symbol $\oplus$ signifies the logical exclusive or (XOR) operation. The result of these operations is to add at least partial randomization to the input blocks. The operations are reversible because a second XOR operation between each block and the corresponding pseudorandom string will restore the original input block.

If more economy but less security is desired, shorter pseudorandom strings can be used, and only a portion of each input block randomized in this fashion. Moreover, there are alternatives to block ciphers for generating the pseudorandom strings. For example, each of the pseudorandom strings described above may be a block from a long pseudorandom string generated by a stream cipher.

In a second encryption step 20, each of Y1, Y2, etc. is encrypted by AES, taking K2 as the input key, to produce a block of cipher text C1, C2, etc. That is, C1=$AES_{K2}$(Y1), C2=$AES_{K2}$(Y2), . . . , Cn=$AES_{K2}$(Yn).

Figure 2:
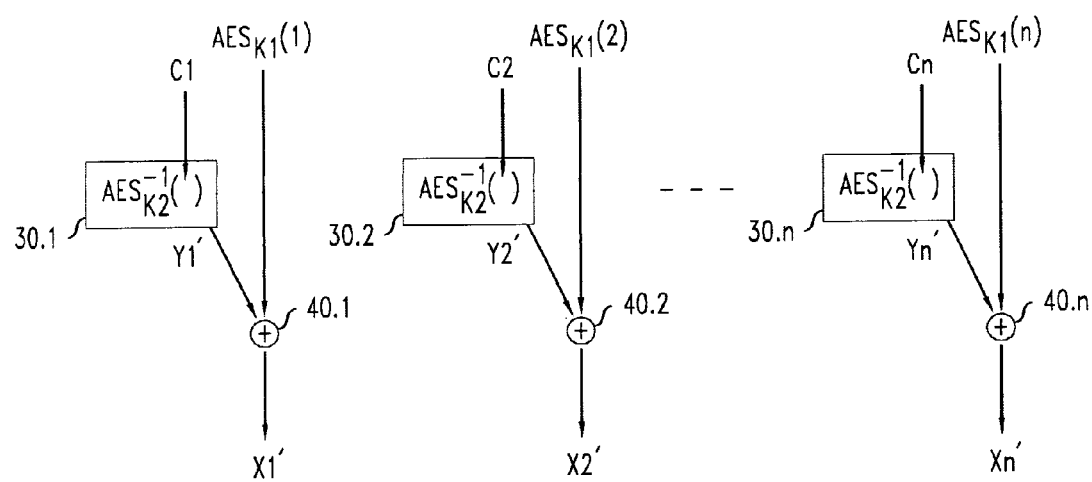
FIG. 2 is a flow diagram illustrating a decryption method according to the invention in one example embodiment.

The decryption is the reverse of the above steps. For example, with reference to FIG. 2, C1 is decrypted in steps 30.1, 40.1 to X1' by the following:

$$Y1'=AES_{K2}^{-1}(C1)$$

$$X1'=AES_{K1}(1) \oplus Y1'.$$

Similarly, steps 30.2, . . . , 30.*n* are applied to obtain Y2', . . . , Yn', from C2, . . . , Cn, and steps 40.2, . . . , 40.*n* are applied to obtain X2', . . . , Xn' from Y2', . . . , Yn'.

Figure 3:
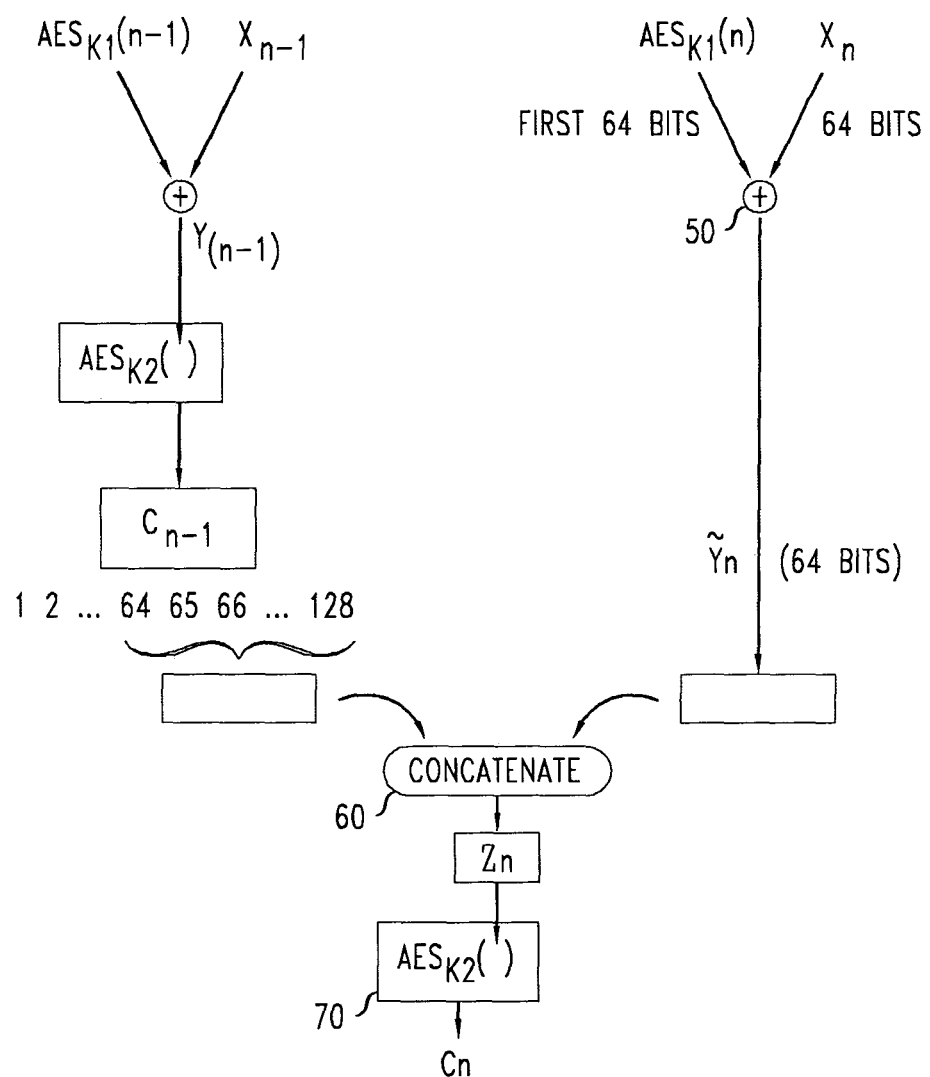
FIG. 3 is a flow diagram illustrating a method that may be used in a variation of the method of FIG. 1, for encrypting a partial string of input data.

Optionally, an efficient method can be used to encrypt and decrypt the last input block Xn in the event that it has fewer than the full block size of 128 bits. For purposes of illustration, we suppose that Xn has 64 bits. Then for encryption, with reference to FIG. 3, the XOR operation 50 is performed between Xn and the first 64 bits of $AES_{K1}$(n). The resulting 64-bit string Ỹn is concatenated (step 60) with the last 64 bits of the preceding encrypted block C(n−1) to form a 128-bit string Zn. The resulting string is encrypted (step 70) in the normal way using $AES_{K2}(\cdot)$.

Figure 4:
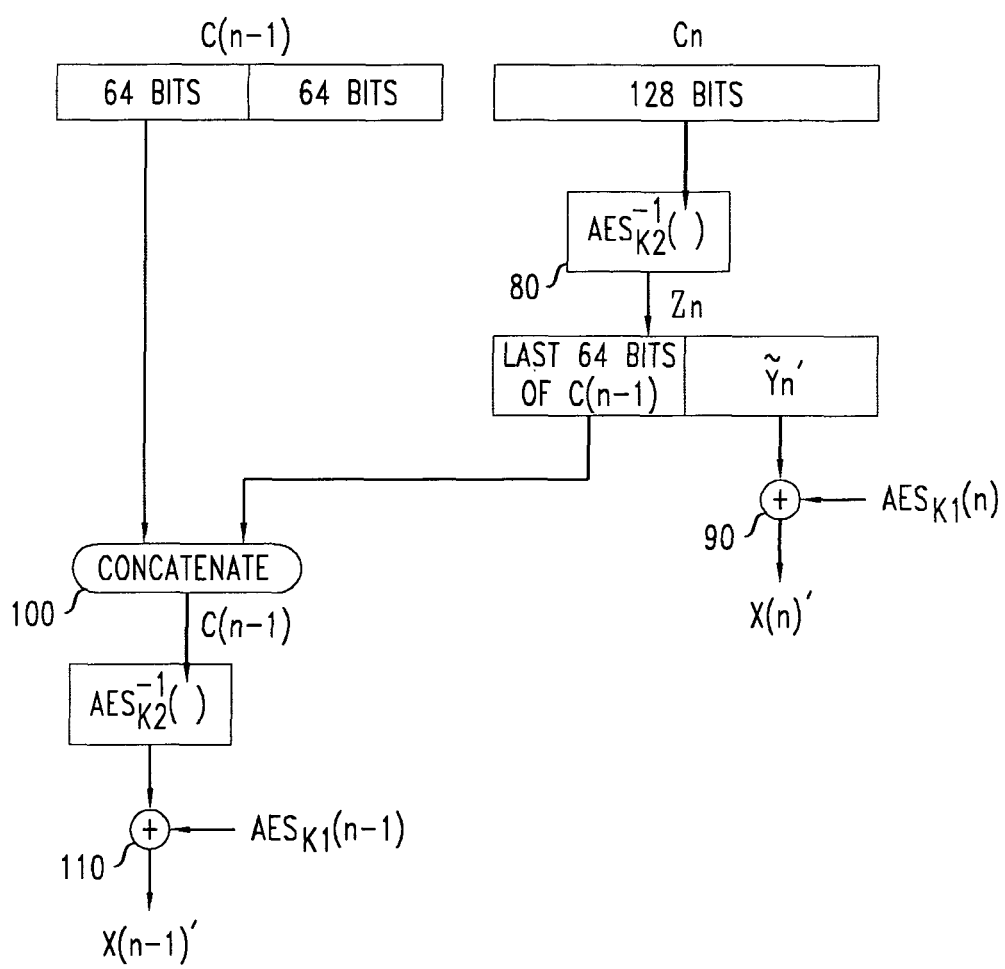
FIG. 4 is a flow diagram illustrating a method that may be used in a variation of the method of FIG. 2, for decrypting a partial string of input data.

With reference to FIG. 4, for decrypting C(n−1) and Cn, the receiver first waits for the arrival and collection of the 192 bits consisting of: the first 64 bits of C(n−1), and the 128 bits of Cn resulting from the encryption 70 of the concatenation 60 of Xn (as randomized to form Ỹn) with the last 64 bits of C(n−1). First, Cn, i.e., the last 128 bits corresponding to the concatenated string are decrypted (step 80). Xn' can then be recovered (step 90) from Ỹn', i.e., from the last 64 of the decrypted bits. Then C(n−1) can be reassembled by concatenation (step 100) and decrypted to obtain X(n−1)'.

It should be noted that the methods described here may be carried out by a digital signal processor, a digital computer acting under the control of a software program, or other suitably conformed circuitry. After encryption, the message will be suitably conditioned and transmitted as a communication signal over an air interface or onto an optical or electronic transmission medium. Before decryption, the receiver will likewise receive the communication signal from the air interface or from the optical or electronic medium and will subject it to suitable conditioning.

What is claimed is:

1. A method for message encryption, comprising:
    deriving, by a processor, a first key (K1) and a second key (K2) from a session key;
    generating, by the processor, a first pseudorandom string of bits as a function of K1 using a first-cipher algorithm;
    generating, by the processor, a second pseudorandom string of bits as a function of K1 using the first cipher algorithm, wherein a state of randomization of said first pseudorandom string is independent of a state of randomization of said second pseudorandom string;
    encrypting a first block of message data with the first pseudorandom string, the encrypting comprising performing a reversible XOR operation between each of at least some bits of the first block and each of respective bits of the first pseudorandom string;
    encrypting a successive second block of message data with the second pseudorandom string, the encryption comprising performing a reversible XOR operation between each of at least some bits of the second block and each of respective bits of the second pseudorandom string;
    producing an encrypted message by encrypting the first and second encrypted blocks of message data using a second cipher algorithm that takes K2 as an input key; and
    transmitting the encrypted message.

2. The method of claim 1, wherein said first and second cipher algorithms are a same cipher algorithm.

3. A method for message decryption, comprising:
    receiving an encrypted message,
    deriving, by a processor, a first key (K1) and a second key (K2) from a session key;
    generating, by the processor, first and second pseudorandom strings of bits as a function of a first cipher algorithm and K1, wherein a state of randomization in the first pseudorandom string is independent of a state of randomization of the second pseudorandom string;
    producing by the processor a first decrypted data block, including:
        operating on a first encrypted block of the encrypted message with an inverse of a second cipher algorithm taking K2 as an input key, thereby producing first intermediate bits; and
        performing an XOR operation between each of at least some of the first intermediate bits and each of respective bits of the first pseudorandom string thereby decrypting a first encrypted block of the encrypted message; and
    producing by the processor a second decrypted data block, including:
        operating on a second encrypted block of the encrypted message with the inverse of the second cipher algorithm taking K2 as an input key, thereby producing second intermediate bits; and
        performing an XOR operation between each of at least some of the second intermediate bits and each of respective bits of the second pseudorandom string thereby decrypting a second encrypted block of the encrypted message.

4. The method of claim 3, wherein said first and second cipher algorithms are a same cipher algorithm.

5. A method for message encryption, comprising:
    deriving, by a processor, a first key (K1) and a second key (K2) from a session key;
    generating, by the processor, a first pseudorandom string of bits as a function of K1 using a cipher algorithm;
    generating, by the processor, a second pseudorandom string of bits as a function of K1 using the first cipher algorithm, wherein a state of randomization of said first pseudorandom string is independent of a state of randomization of said second pseudorandom string;
    encrypting a first block of message data with the first pseudorandom string, the encrypting comprising executing a first operation associated with the first pseudorandom string thereby yielding at least partial randomization of the first block;
    encrypting a successive second block of message data with the second pseudorandom string, the encryption comprising executing a second operation associated with the second pseudorandom string thereby yielding at least partial randomization of the second block;

producing an encrypted message by encrypting the first and second encrypted blocks of message data using a second cipher algorithm that takes K2 as an input key; and transmitting the encrypted message.

6. The method of claim 5, wherein said first and second cipher algorithms are a same cipher algorithm.

7. The method of claim 5, wherein the first operation includes an XOR operation that takes the first pseudorandom string and the first intermediate bits as inputs, and the second operation includes an XOR operation that takes the second pseudorandom string and the second intermediate bits as inputs.

8. A method for message decryption, comprising:

receiving an encrypted message, including first and second encrypted data blocks;

deriving, by a processor, a first key (K1) and a second key (K2) from a session key;

generating, by the processor, first and second pseudorandom strings of bits as a function of a first cipher algorithm and K1, wherein a state of randomization of the first pseudorandom string is independent of a state of randomization of the second pseudorandom string;

producing by the processor a first decrypted message block, including:

computing first intermediate bits from the first encrypted data block using an inverse of a second cipher algorithm that takes K2 as an input key; and executing a first operation associated with the first pseudorandom string and the first intermediate bits that restores a first original input block associated with the encrypted message; and producing by the processor a second decrypted message block, including:

computing second intermediate bits from the second encrypted data block using the inverse of the second cipher algorithm that takes K2 as an input key; and executing a second operation associated with the second pseudorandom string and the second intermediate bits that restores a second original input block associated with the encrypted message.

9. The method of claim 8, wherein said first and second cipher algorithms are a same cipher algorithm.

10. The method of claim 8, wherein the first operation includes an XOR operation that takes the first pseudorandom string and the first intermediate bits as inputs, and the second operation includes an XOR operation that takes the second pseudorandom string and the second intermediate bits as inputs.

11. An encryption apparatus, comprising:

at least one processor, configured to:

derive a first key (K1) and a second key (K2) from a session key;

generate a first pseudorandom string of bits as a function of K1 using a first cipher algorithm;

generate a second pseudorandom string of bits as a function of K1 using the first cipher algorithm, wherein a state of randomization of said first pseudorandom string is independent of a state of randomization of said second pseudorandom string;

encrypt a first block of message data with the first pseudorandom string, the encrypting comprising executing a first operation associated with the first pseudorandom string thereby yielding at least partial randomization of the first block; and encrypt a successive second block of message data with the second pseudorandom string, the encrypting comprising executing a second operation associated with the second pseudorandom string thereby yielding at least partial randomization of the second block;

producing an encrypted message by encrypting the first and second encrypted blocks of message data using a second cipher algorithm that takes K2 as an input key; and transmit the encrypted message.

12. The apparatus of claim 11, wherein said first and second cipher algorithms are a same cipher algorithm.

13. The apparatus of claim 11, wherein the first operation includes an XOR operation that takes the first pseudorandom string and the first block as inputs, and the second operation includes an XOR operation that takes the second pseudorandom string and the second block as inputs.

14. A decryption apparatus, comprising:

at least one processor, configured to:

receive an encrypted message, including first and second encrypted data blocks;

derive a first key (K1) and a second key (K2) from a session key;

generate first and second pseudorandom strings of bits as a function of a first cipher algorithm and K1, wherein a state of randomization of the first pseudorandom string is independent of a state of randomization of the second pseudorandom string;

produce a first output, including:

computing first intermediate bits from the first encrypted data block using an inverse of a second cipher algorithm that takes K2 as an input key; and executing a first operation associated with the first pseudorandom string and the first intermediate bits that restores a first original input block associated with the encrypted message; and produce a second output, including:

computing second intermediate bits from the second encrypted data block using the inverse of the second cipher algorithm that takes K2 as an input key; and executing a second operation associated with the second pseudorandom string and the second intermediate bits that restores a second original input block associated with the encrypted message.

15. The apparatus of claim 14, wherein said first and second cipher algorithms are a same cipher algorithm.

16. The apparatus of claim 14, wherein the first operation includes an XOR operation that takes the first pseudorandom string and the first intermediate bits as inputs, and the second operation includes an XOR operation that takes the second pseudorandom string and the second intermediate bits as inputs.

* * * * *